April 27, 1954 R. K. CROOKS 2,677,050
GAIN CONTROL MEANS FOR FREQUENCY MODULATION RECEIVERS
Original Filed April 28, 1951
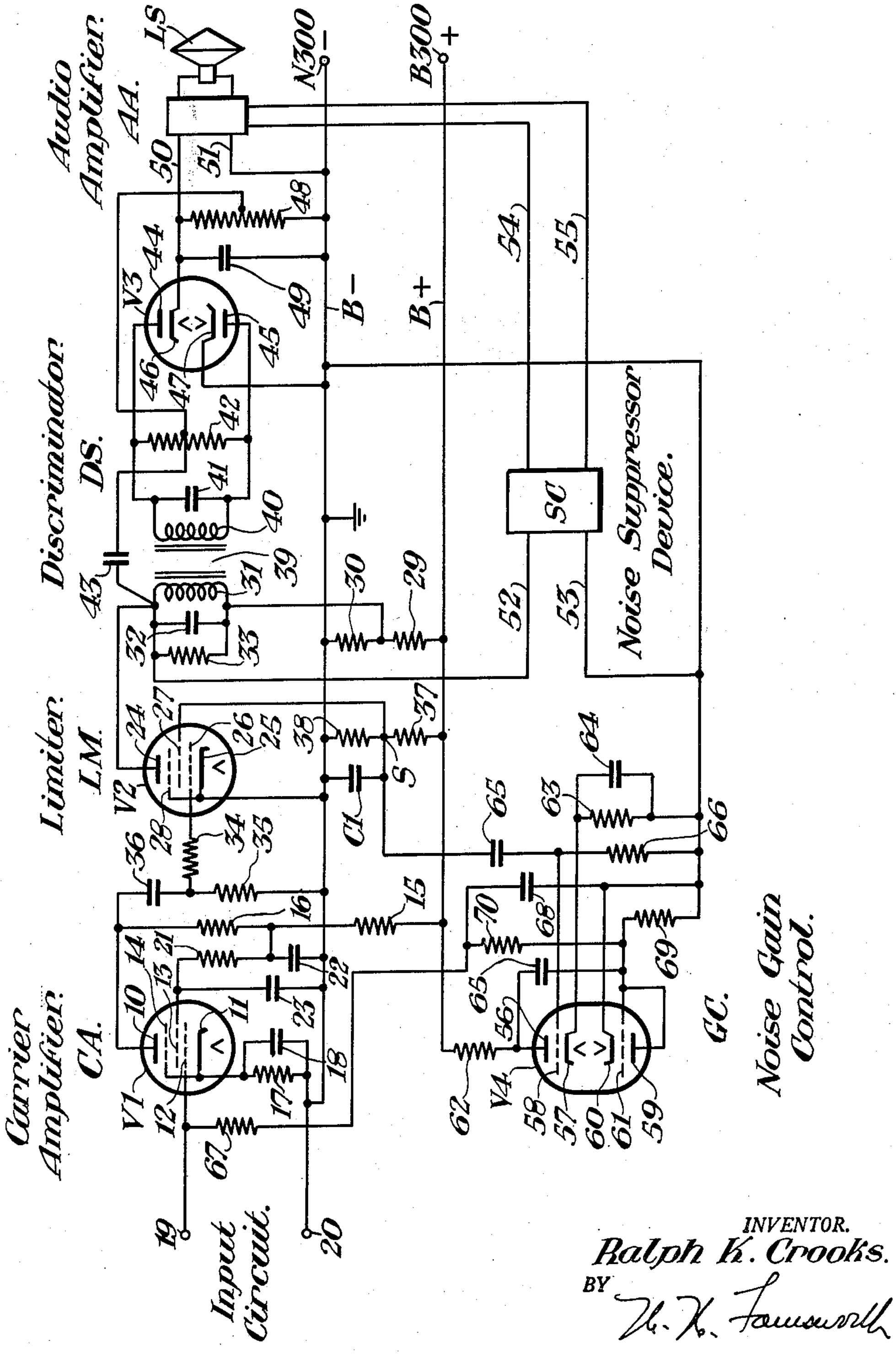
INVENTOR.
Ralph K. Crooks.
BY
*[signature]*
HIS ATTORNEY Patented Apr. 27, 1954 2,677,050

UNITED STATES PATENT OFFICE 2,677,050

GAIN CONTROL MEANS FOR FREQUENCY MODULATION RECEIVERS

Ralph K. Crooks, Worthington, Ohio, assignor to Westinghouse Air Brake Company, Wilmerding, Pa., a corporation of Pennsylvania Original application April 28, 1951, Serial No. 223,628. Divided and this application July 30, 1952, Serial No. 301,763

3 Claims. (Cl. 250—20)

My invention relates to gain control means for FM receivers.

The present application is a division of my copending application for Letters Patent of the United States, Serial No. 223,628, filed April 28, 1951, now abandoned, for Gain Control and Detection Means for FM Receivers.

In many communication systems the noise energy varies over very wide limits, say, over a ratio of 1000 to 1. For example, I have found that in mine carrier communication systems using frequency modulated carrier current the noise energy may vary from 100 microvolts to 100,000 microvolts. For this reason the noise suppression means, or so-called squelch circuit means, which is frequently provided for receivers of a carrier communication current is of little value because such devices become saturated and the receivers fail to function as intended under conditions of high noise energy.

Accordingly, an object of my invention is the provision of improved receiving apparatus for frequency modulated communication current to minimize the loss of intelligibility of the received message due to noise energy.

A further feature of my invention is the provision of receiving apparatus for frequency modulated communication current incorporating improved means to increase the noise energy range for which the noise suppression means functions in its intended manner.

A still further feature of my invention is the provision of frequency modulated communication current receiving apparatus incorporating novel means to govern the gain control according to the magnitude of the noise energy present.

Other objects, features and advantages of my invention will appear as the specification progresses.

The foregoing objects, features and advantages of my invention are attained by the provision of a frequency modulated receiving apparatus incorporating improved means for providing a noise voltage which is not completely limited even at the higher levels of the noise energy present. That is, the receiver includes a semilimited noise voltage receiving means. To this end I provide a means to pick up the noise energy at a point where the voltage is not completely limited at the high noise energy level. Furthermore, I provide a gain control unit which functions to convert the noise voltage into a gain control voltage by which the gain of the carrier amplifier of the receiver is automatically adjusted in accordance with the noise energy existing at the input of the receiver. This noise voltage responsive means is substantially nonresponsive to the signal energy applied to the input of the receiver. Consequently, when the noise level is high the gain of the carrier frequency amplifier of the receiver is lower than when the noise energy level is low. Thus, the usual noise suppression means or so-called squelch circuit arrangement which I provide for the receiver, is made to operate satisfactorily in its intended manner over a wide range of noise energy.

I shall describe a preferred form of apparatus embodying my invention and shall then point out the novel features thereof in claims.

The accompanying drawing is a schematic view showing one form of apparatus embodying my invention when used with a mine communication system using frequency modulation and which system preferably employs a transmitting circuit comprising the trolley wire and track rails of the mine electric railway.

It is to be understood that apparatus embodying my invention is not limited to receiving apparatus for mine communication systems and this one application of the apparatus is an illustration of one system of the many systems with which the invention is useful.

Referring to the drawing, a complete receiver is illustrated schematically with certain of the elements shown in a conventional manner. The essential elements of this receiver comprise a carrier amplifier stage CA, a limiter stage LM, a discriminator stage DS, an audio amplifier stage AA, a noise gain control unit GC, and a noise suppression or squelch circuit means SC.

Suitable power sources are provided for the receiver, a high voltage direct current source, such as a battery not shown, is connected to the terminals B300 and N300 which are connected to the bus wires B+ and B− respectively, the bus wire B− being connected to ground in the manner customarily employed in apparatus of this type. A low voltage heater source with heater circuits for the electron tubes of the apparatus are provided, but this low voltage source and the heater circuits are not shown in order to simplify the drawing because they would be in accordance with standard practice and they are not needed for an understanding of my present invention.

As an aid in the understanding of the apparatus, it is pointed out that mine communication systems of the type here involved use a relatively low carrier frequency say, a carrier of the order of 35 kc., this carrier being frequency modulated by voice frequency. Furthermore, the transmitting circuit preferably includes the trolley wire and the track rails of the mine electric railway. However, it is to be understood that my invention is not limited to such mine communication systems and it can be applied to systems of the inductive and space radio type.

The carrier amplifier CA includes a pentode V1, but other types of electron tubes can be used. The tube V1 is provided with an anode 10, a cathode 11, a control grid or electrode 12, and two other grids 13 and 14, the grid 14 being connected to the cathode 11 inside of the tube. The tube V1 is provided with an anode circuit which extends from the positive bus wire B+ through resistors 15 and 16 in series, anode 10 and the tube space to cathode 11, and a biasing unit consisting of resistor 17 and capacitor 18 in multiple to the negative bus wire B−. The control grid 12 and cathode 11 of the tube are connected across a pair of input terminals 19 and 20 to which an input circuit not shown is connected. This input circuit would include means by which a frequency modulated communication current is picked up or received from an associated remote transmitter, the transmitting medium between the transmitter and the input circuit being of any suitable form but which transmitting medium in the system here involved includes the trolley wire and the track rails of the electric railway.

The grid 13 of tube V1 is provided with a positive potential from the power bus wire B+ through resistors 15 and 21 and is provided with by-pass capacitors 22 and 23.

It follows that a frequency modulated communication current appearing at the terminals 19 and 20 will be amplified in the usual manner by the tube V1, the gain being determined by the proportioning of the parts and also by a bias voltage applied to the control grid 12 in a manner to be described hereinafter. It is clear that the amplifier CA will amplify noise energy that may be applied to the terminals 19 and 20. Also, it is to be pointed out that if the one stage CA does not provide sufficient amplification of the carrier communication current, additional stages, each similar to the stage CA can be coupled to the stage CA in cascade.

As stated above, in mine communication systems of the type here contemplated, the carrier is of a relatively low frequency and a mixer stage and an intermediate frequency amplifier stage for the receiving apparatus are not required but it is clear that in systems using a high carrier frequency the heterodyne form of receiver can be provided.

The limiter LM includes a pentode V2 having an anode 24, a cathode 25, a control grid 26 and two other grids 27 and 28, the grid 28 being a suppressor grid connected to the cathode inside of the tube and the grid 27 being a screen grid. An anode circuit for tube V2 is powered from a potentiometer consisting of resistors 29 and 30 connected in series across the bus wires B+ and B−. The junction terminal of resistors 29 and 30 is connected to the anode 24 through a winding 31 to be referred to shortly, and the cathode 25 is connected directly to the bus wire B−. The control grid 26 and cathode 25 are coupled to the output or anode circuit of the amplifier tube V1 through resistors 34 and 35 and a capacitor 36, as will be apparent by an inspection of the drawing. Also, the screen grid 27 is provided with a positive potential with respect to the cathode 25 by being connected to the junction terminal S of resistors 37 and 38 connected in series across the bus wires B+ and B−. The resistor 38 is provided with a by-pass capacitor C1 which is proportioned to pass energy of the carrier frequency range but substantially block energy of the audio frequency range. Thus the resistor 38 functions as a load element connected to the screen grid 27 and across which resistor there are developed voltages that vary according to the amplitude variations of the input voltage applied to the limiter tube, the carrier frequency being by-passed by capacitor C1. In other words, because the screen grid 27 acts as a second plate for the tube V2, the noise energy which causes audio frequency variations in the magnitude of the energy applied to the limiter create corresponding audio frequency voltages across the resistor 38, but the carrier frequency energy is by-passed by capacitor C1.

The parts are so proportioned that the tube V2 does not become completely saturated as to its screen grid circuit at the high level of the noise energy to which the receiver is ordinarily subjected and the audio frequency voltages created across the load element 38 are in direct proportion to the noise voltages appearing at the input terminals 19 and 20. The use of the unit comprising the load resistor 38 and its by-pass capacitor C1 will be referred to hereinafter.

The general circuit arrangement for the discriminator DS is that widely used in FM receivers and the functions of which are well known to those skilled in the art. It is sufficient for the purpose of the present application to describe the discriminator network only as necessary to explain the present improvement therefor. The discriminator DS comprises a transformer 39, a resistor 42 and a twin diode V3. The transformer 39 is provided with a primary winding 31 and a secondary winding 40. The primary winding 31 which is interposed in the anode circuit of the limiter LM as previously explained is parallel tuned by a capacitor 32 and a resistor 33. Also, the secondary winding 40 is parallel tuned by a capacitor 41. These primary and secondary circuits are tuned to resonance at a selected carrier frequency which is preferably the center carrier frequency of the communication current used. Thus there is induced in the secondary winding 40 communication voltages which are 90° out of phase with the voltages across the primary winding 31.

In the discriminator network as heretofore provided, the limiter anode terminal of the primary winding of the transformer is connected to amid terminal of the secondary winding through a direct current blocking capacitor so that there is a direct connection between these two points as far as the carrier communication current is concerned. By this connection the communication voltage of the primary circuit is injected into the secondary circuit without any phase shift. Thus, from each outside terminal of the secondary winding to ground there exists a communication voltage in phase quadrature wtih the induced communication voltage due to this direct connection, the induced voltage in each half of the secondary winding being of opposite relative polarity. It follows that there exists between each outside terminal of the secondary winding and ground a resultant voltage which is the vector sum of the phase quadrature related voltage across each half of the secondary winding and the communication voltage of the primary winding. These resultant voltages have a definite relationship as determined by the frequency modulation of the carrier and due to which relationship the frequency modulation is translated into voltages suitable for detection of the communication signal. It is apparent that if the half portions of the secondary winding are not alike electrically the resultant voltages at the outside terminals of the secondary winding will deviate in their desired relationship and distortion of the communication signal results.

I have found that in the manufacturing of windings for discriminator transformers the connection of the mid terminal at the electrical center of the secondary winding at the carrier frequency involved is difficult and the mid terminal in the finally manufactured winding is usually not the electrical center of the winding due to manufacturing inaccuracies. With a winding completed the mid terminal can be changed or adjusted only by a rebuilding of the winding and this is an expensive procedure and causes a high percentage of rejections.

I have further found that this problem can be overcome by providing an improved arrangement in which a resistor 42, as shown in the drawing, is connected across the secondary winding 40 and the mid terminal of the resistor 42 connected to the primary winding 31 through a blocking capacitor 43. That is to say, in place of providing a mid terminal for secondary winding 40 to which the connection including capacitor 43 is connected, I provide a resistor 42 which is connected across the winding 40 and the connection including the capacitor 43 is connected to a mid terminal of resistor 42. The electrical center of the resistor 42 can be determined readily and can be easily adjusted one way or the other if required. Thus, by the improvement here provided the resultant voltages created at the outside terminals of the secondary winding 40 can be made to have the desired relationship and the communication signal of the modulated carrier can be detected free of distortion, at least free from distortion as far as the discriminator network is concerned.

The outside terminals of the secondary winding 40 are connected to the anodes 44 and 45, respectively, of the diode tube V3, and the cathodes 46 and 47 of the two sections of the tube are connected to the outside terminals of a resistor 48. The resistor 48 is provided with a by-pass capacitor 49 and its mid terminal is connected to the mid terminal of resistor 42. The lower terminal of resistor 48 and the cathode 47 are connected to the low potential bus wire B—. Hence, in the well-known manner for discriminators of the type here involved, a direct voltage variable in magnitude in accordance with the frequency modulation of the carrier current will be created between the top terminal of resistor 48 and ground and these points are connected to the input of the audio amplifier AA by means of wires 50 and 51.

The audio amplifier AA may be any one of several well known arrangements for audio amplifiers and it is here shown conventionally since its specific structure is not a part of the present invention and a standard form of amplifier can be used. The output of the audio amplifier AA is connected to a signal responsive device which is here illustrated as a loud-speaker LS.

It follows that when a frequency modulated carrier current is received at the terminals 19 and 20 it will be amplified and detected and the communication current will be applied to the loud-speaker LS relatively free from distortion due to any manufacturing inaccuracies of the discriminator.

Because the communication current receiver is subjected to noise energy, a noise suppression device or squelch circuit arrangement is provided, the device SC being shown in a conventional block form because it can be any one of several known arrangements and its specific structure is not a part of the present invention. It is sufficient for the present application to explain that a voltage which is here taken from the output of the limiter tube V2 is applied to the input of the noise suppression device SC by an input circuit including wires 52 and 53. The noise suppression device SC includes an amplifier, and a detector or rectifier which provide a bias direct voltage according to the energy applied to the input and which bias voltage is applied to the audio amplifier AA through an output circuit including wires 54 and 55. The arrangement is such that noise energy in the form of amplitude variations of the energy appearing in the output of the limiter are converted into a direct voltage which is applied to the audio amplifier AA in such a manner as to bias the amplifier AA to a desensitized condition in response to the noise energy appearing at the output of the limiter stage LM. When communication current of frequency modulation appears at the output of the limiter stage LM the noise suppression device tends to remove the bias on the audio amplifier and it functions in its normal sensitivity to pass audio frequency component of the frequency modulated communication current to the loud-speaker. As pointed out hereinbefore, the noise suppression device or squelch circuit arrangement is generally set for a reasonable range of noise energy but noise energy of unusual large variation in energy level tends to render such a device ineffective so that there is a limit to which the usual noise suppression means will satisfactorily desensitize the audio amplifier and at the same time switch the audio amplifier to its usual sensitivity in response to a communication current of a given minimum energy level.

In order to assure that the range of noise energy in the output of the limiter is retained within the desired limits for which the usual noise suppression means SC will satisfactorily function, I provide a noise gain control unit GC.

The noise gain control unit GC includes an amplifier, a rectifier and a load resistor which as here illustrated includes a twin triode V4, one section of the tube V4 being used as an amplifier and the second section being used as a rectifier. Specifically the tube V4 has one section which is provided with an anode 56, a cathode 57 and a control grid 58, and with a second section which is provided with an anode 59, a cathode 60 and a control grid 61, the control grid 61 and anode 59 being connected together for a second section of the tube to function as a rectifier. It is obvious, however, that other forms of a rectifier can be used.

The amplifier section of tube V4 is provided with an anode circuit which can be traced from the bus wire B+ through resistor 62, anode 56 and tube space to cathode 57 and a biasing unit consisting of resistor 63 and capacitor 64 in multiple to the negative bus wire B—. The control grid 58 of the tube V4 is connected to the terminal S of the 38—C1 unit through a capacitor 65 and thus the voltages created across the resistor 38 due to noise energy passing through the receiver in the manner previously explained are applied to the amplifier section of the tube V4 and amplified in the usual manner.

The anode 59 and control grid 61 of the second section of the tube V4 which are connected together as mentioned above are coupled to the anode circuit of the first section of the tube through a capacitor 65, the cathode 60 of the second section being connected to ground through the negative bus wire B—.

The rectifier section of the tube V4 is connected to a load resistor 69, the grounded terminal of which is the positive terminal. The negative terminal of the load resistor 69 is connected to the control grid 12 of the carrier amplifier tube V1 through a connection including the resistors 67 and 70, a carrier by-pass capacitor 68 being connected between the junction terminal of resistors 67 and 70 and ground.

Thus the rectified voltage output of the gain control unit GC is applied to the carrier amplifier stage CA as a negative bias voltage to automatically control the gain thereof according to the noise voltage appearing at the terminal S of the unit 38—C1 connected to the screen grid of the limiter LM. Consequently when noise energy of an extremely high energy level appears at the input terminals 19 and 20 the gain of the carrier amplifier CA is reduced with the result the saturation limit of the limiter LM is not reached and the usual noise suppression device SC functions in its intended manner to desensitize the audio amplifier and assure that the loud speaker LS remains silent.

Receiving apparatus here provided has the advantages that loss of intelligibility of the message received at the loud-speaker due to noise energy of high energy level is minimized.

Although I have herein shown and described but one form of gain control means for FM receivers embodying my invention, it is understood that various changes and modifications may be made therein within the scope of the appended claims without departing from the spirit and scope of my invention.

Having thus described my invention, what I claim is:

1. In receiving apparatus for a frequency modulated carrier communication current having a carrier frequency amplifier, a limiter, a discriminator and an audio frequency amplifier connected in cascade and being provided with a noise suppression device which includes means effective to create a direct bias voltage in response to amplitude voltage variations and connected between output terminals of the limiter and input terminals of the audio frequency amplifier, said limiter being provided with a screen grid in addition to its usual control grid and cathode, the combination comprising a unit including a load resistor and a capacitor connected in multiple, means to connect said unit and a power source across the screen grid and cathode of said limiter, said capacitor proportioned to pass current of the carrier frequency of said communication current and to block the low frequencies of noise energy, the voltage of said power source connected to said screen grid being ineffective to saturate the limiter tube, a gain control unit including a rectifier, another load resistor connected to the output of said rectifier, means including a capacitor to couple the input of said rectifier to said load resistor of said unit, said rectifier being poled to create a direct voltage across said another load resistor in response to the noise voltage across the resistor of said unit, and circuit means to connect selected terminals of said another load resistor to a control electrode of the carrier frequency amplifier for applying the voltage of said another load resistor as a gain control voltage to the carrier frequency amplifier.

2. In receiving apparatus for a frequency modulated carrier communication current, the combination comprising, a carrier frequency amplifier tube having an anode, a cathode and a control grid; a limiter tube having an anode, a cathode, a control grid and another grid; a pair of input terminals adapted to receive a frequency modulated carrier communication current and subject to noise energy variable in amplitude, said input terminals being connected across the control grid and cathode of said carrier frequency amplifier tube, means to couple the anode and cathode of the carrier frequency amplifier tube to the control grid and cathode of said limiter tube, a winding and a power source connected across the anode and cathode of said limiter tube to receive the energy received at said pair of input terminals, a unit including a load resistor and a capacitor in multiple, said unit and a power source connected across said another grid and cathode of said limiter tube, said capacitor effective to by-pass the carrier frequency of said communication current whereby there is created across said load resistor a voltage variable in amplitude according to the noise energy received at said input terminals; a control unit including a gain control amplifier having an anode, a cathode and a control grid; and a rectifier; means including a capacitor to couple the control grid and cathode of said gain control amplifier to said load resistor, an anode circuit including a power source connected to the anode and cathode of the gain control amplifier, another load resistor connected to said rectifier, means including a capacitor to couple said rectifier to the anode circuit of said gain control amplifier, and circuit means to connect said another load resistor to said control grid of said carrier frequency amplifier tube to control the gain of that tube according to the noise energy received at said input terminals.

3. In receiving apparatus for frequency modulated carrier communication current, the combination comprising, a pair of input terminals adapted to pick up a frequency modulated carrier communication current and subject to picking up noise energy variable in its amplitude; a carrier frequency amplifier tube provided with an anode, a cathode and a control grid; said tube having its control grid and cathode connected across said input terminals, an anode circuit including a power source connected to the anode and cathode of said amplifier tube; a limiter tube provided with an anode, a cathode, a control grid and another grid; said limiter tube having its control grid and cathode coupled to said anode circuit of the carrier amplifier tube, another anode circuit including a power source and a winding connected to the anode and cathode of said limiter tube to receive the energy picked up by the input terminals, a unit including a load resistor and a capacitor connected in multiple, said capacitor proportioned to pass the carrier frequency of said communication current and block the frequency of said noise energy, said unit and a power source connected across said another grid and cathode of said limiter tube for creating across said load resistor a voltage variable according to the noise energy picked up at said input terminal, a rectifier, another load resistor, circuit means including capacitance to couple said rectifier across the load resistor of said unit and to said another load resistor to create across said another load resistor a unidirectional voltage according to the noise voltage applied to said unit, and other circuit means to connect selected terminals of said another load resistor across the control grid and cathode of said carrier frequency amplifier tube for governing the gain of that tube according to the noise energy voltage.

References Cited in the file of this patent

UNITED STATES PATENTS

| Number | Name | Date |
|---|---|---|
| 2,282,092 | Roberts | May 5, 1942 |
| 2,329,570 | Wellenstein et al. | Sept. 14, 1943 |
| 2,454,415 | Tourshou | Nov. 23, 1948 |
| 2,456,915 | Carlson | Dec. 21, 1948 |
| 2,561,059 | Corrington | July 17, 1951 |